Figure 1:
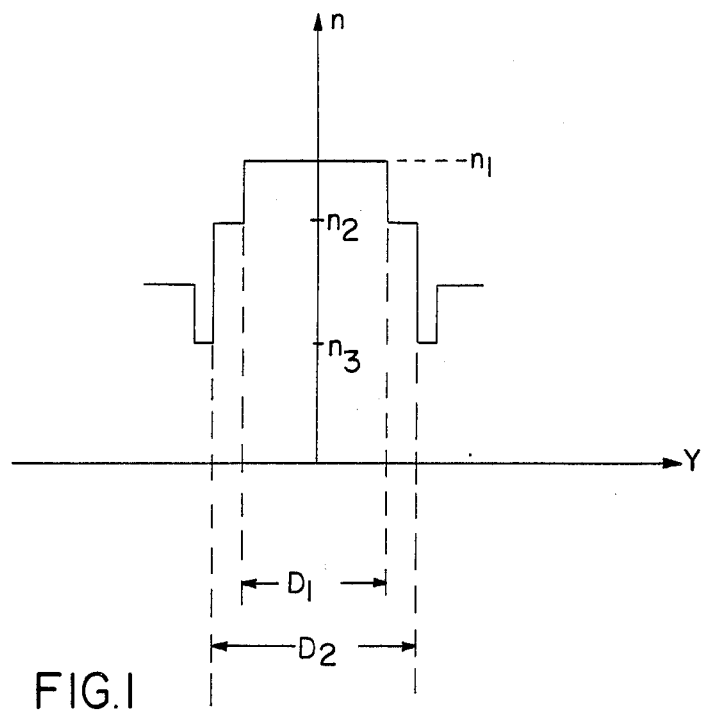
Figure 2:
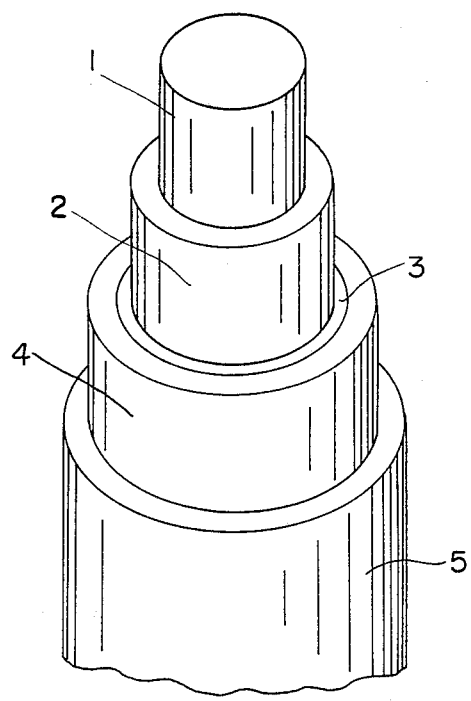

United States Patent [19]

Nattermann et al.

[11] Patent Number: 4,974,932
[45] Date of Patent: Dec. 4, 1990

[54] STEPPED-INDEX OPTICAL FIBER FOR TRANSMISSION OF HIGH-POWER LASER RADIATION

[75] Inventors: Kurt Nattermann, Ingelheim; Hubert Bader, Mainz, both of Fed. Rep. of Germany

[73] Assignee: Schott Glaswerke, Mainz, Fed. Rep. of Germany

[21] Appl. No.: 508,629

[22] Filed: Apr. 13, 1990

[30] Foreign Application Priority Data

Apr. 15, 1989 [IT] Italy .................................... 3912400

[51] Int. Cl.$^5$ .............................................. G02B 6/22
[52] U.S. Cl. ................................ 350/96.33; 350/96.34
[58] Field of Search ................. 350/96.30, 96.33, 96.34

[56] References Cited

U.S. PATENT DOCUMENTS

| 4,691,990 | 9/1987 | Cohen et al. | 350/96.33 |
| 4,755,022 | 7/1988 | Ohashi et al. | 350/96.33 |
| 4,770,492 | 9/1988 | Levin et al. | 350/96.33 X |
| 4,846,548 | 7/1989 | Klainer | 350/96.33 X |
| 4,852,968 | 8/1989 | Reed | 350/96.33 |

FOREIGN PATENT DOCUMENTS 0234233 9/1987 European Pat. Off. .

Primary Examiner—John D. Lee
Attorney, Agent, or Firm—Millen, White & Zelano

[57] ABSTRACT

A stepped-index optical fiber is disclosed for transmission of high-power radiation, especially laser, radiation, which fiber is capable of transmitting radiation without substantially impairment of the beam quality (of the beam product), can be bent with a specific radius, and wherein the cross-sectional area of the beam on the input coupling surface of the fiber can be very large. Formulae are presented for calculating the dimensions of the fiber.

21 Claims, 1 Drawing Sheet

STEPPED-INDEX OPTICAL FIBER FOR TRANSMISSION OF HIGH-POWER LASER RADIATION

BACKGROUND OF THE INVENTION

One characteristic variable of lasers is radiant power. In case of high-power continuous-wave lasers, radiant power can be in the kilowatt range and thereabove; in case of pulsed lasers, peak power is even frequently in a range far above 1 megawatt. On the one hand, these high radiant powers open up many industrial applications for lasers; on the other hand, on account of these high outputs, there is the danger of destruction of optical components. Therefore, great care is required in the selection of optical parts for lasers of high radiant power.

The beam product ($\theta \cdot D$) is another characteristic variable. For a beam which is rotationally symmetrical with respect to the axis, this is the product of the diameter D in meters with the full angular divergence $\theta$ in radians of the beam at the laser output. In the more general case of beams that are not rotationally symmetrical, the chord of the beam and/or the angular divergence of the radiation depending on the angle $\phi$ perpendicular to the beam axis, $\theta \cdot D$ denotes the maximum of $\theta(\phi) \cdot D(\phi)$ in dependence on $\phi$, wherein $\theta(\phi)$ means the full angular divergence in rad of the radiation in dependence on $\phi$, and $D(\phi)$ means the chord passing through the apex of angle $\phi$, in m, depending on $\phi$, and $\theta(\phi)$ and $D(\phi)$ are referred to the output of the laser. In this definition, the beam product, though based on the laser output, need only rarely be measured directly at the laser output to determine this product. This is so because the beam product remains preserved if guidance of the beam is carefully executed. In other words, the beam product, with observance of known rules, is a preserved variable characterizing the radiation and can be measured even at a large distance from the laser. Especially in case of power lasers, the beam product can be readily determined because the radiation intensity of these lasers drops abruptly in most cases as soon as a critical value for the distance from the beam axis has been exceeded, i.e. the contour of the laser beam in the plane perpendicular to the beam axis is sharply defined. However, even if the intensity does not drop abruptly with increasing distance from the beam axis, the beam product can be determined with adequate accuracy—for example by defining the contour of the laser beam by the $1/e^2$ value of the radiation intensity, based on the intensity maximum.

For the radiation at the output of a laser of high power, values of $1 \cdot 10^{-3}$ m to $5 \cdot 10^{-2}$ m are usual for the beam diameter, and values of $1 \cdot 10^{-3}$ rad to $5 \cdot 10^{-2}$ rad are customary for the full angular divergence; in special cases, the values can even lie far above these numbers. Values typical for the beam product of high-power lasers are $2 \cdot 10^{-5}$ rad·m to $3 \cdot 10^{-4}$ rad·m; for example, for Nd lasers in continuous-wave operation with outputs of 100 W up to 1 kW, values of $5 \cdot 10^{-5}$ rad·m to $2 \cdot 10^{-4}$ rad·m are usual, and for Nd lasers in continuous-wave operation with more than 1 kW, values of up to $3 \cdot 10^{-4}$ rad·m are customary.

A low beam product is equivalent to good quality of laser radiation. For usage aspects, a good beam quality, or a low beam product, is of essential importance—many uses are only opened up if the beam product is adequately low (for example: H. Weber, "High Power Nd-Lasers for Industrial Applications", Proc. SPIE 650, p. 92, 1986). For this reason, considerable expenses are incurred in the development of lasers for medical and industrial applications in order to reduce the beam product of laser radiation.

With adequate care, radiation can be guided by means of optical components (lenses, mirrors, etc.) without substantially altering its beam product. If such care is lacking, the beam product is enlarged. A reduction of the beam product, in contrast thereto, is possible in principle only with toleration of, in most cases, considerable radiation losses. The manufacturers and users of lasers thus do not accept beam guidance systems which impair the quality of the laser radiation. Thus, if a flexible fiber is to be utilized for transmitting radiation, a decisive advantage resides in the feature that the fiber will transmit the radiation in such a way that the beam product at the emergence end of the fibers, as compared with the value at the inlet end, is only slightly increased.

In optical fibers, the minimum bending radius $R_{min}$ is another decisive characteristic variable. This is the smallest radius to which a fiber can be bent without being destroyed by bending-induced mechanical stresses and without bending-induced radiation losses destroying the fiber or its surrounding, or endangering the fiber or its surrounding, or too greatly reducing the transmission efficiency of the fiber.

The optical fibers presently utilized for power transmission have an elastic behavior upon bending. High mechanical stresses occur, especially on the fiber surface (cladding surface) by bending the fiber to small radii, whereby the fiber can break. However, with the prevailing manufacturing processes for optical fibers, particularly for glass fibers, very high material strengths are achieved. Unless the original strength of the fiber fades, for example due to aging the danger of breakage has ultimately only a subordinate significance as compared with bending-induced radiation losses. In any event, the fiber system must, however, contain safety components interrupting the supply of radiation in case of a fiber break. Suitable detectors for leakage radiation and fiber breakage are conventional.

Bending-induced radiation losses can be "actual bending losses" or so-called transition losses. The radiation loss is generally converted into heat in general still within the fiber or in its immediate surroundings, i.e. the aspects of reduced transmission efficiency of the fiber (that is the ratio of the radiant power transmitted by the fiber to the coupled-in power) and of thermal stressability of the fiber must be taken into account.

Actual bending losses arise because the radiation in the core of bent fibers couples to so-called leakage waves. These losses, however, do not occur along a short fiber section—rather, it is characteristic that they are distributed essentially along the entire bent fiber section. Therefore, by suitable cooling of the fiber, its thermal load produced by bending losses can generally be reduced to such an extent that there is no danger to the fiber. The limits of technical usability of the fiber here arise on account of the diminished transmission efficiency of the fiber or due to the fact that cooling of the fiber becomes too expensive for practical purposes.

Transition losses are produced if the bending of the fiber changes (alteration of bending radius, etc.). The characteristic property of these losses is that they occur along short fiber sections directly at or downstream of the transition point. For this reason, in case of high radiant outputs, the local thermal stress on a fiber can be so high that the fiber cannot be cooled with an expenditure tolerable for practical utilization. This can also be true in case the reduction in transmission efficiency due to transition losses is negligible for the practical applications. In general, at high radiation outputs, the limitations imposed by the transition losses are more significant than those imposed by the bending losses.

It is known experimentally and theoretically that the bending and transition losses depend greatly on the type of fiber and on the bending radius. In most cases, a permissible minimum bending radius can be indicated for a fiber so that it is ensured that these losses are sufficiently small as long as the bending radius of the fiber is larger than this minimum value (in the following: minimum bending radius of the fiber). Also, devices are known by means of which a fiber can be bent only to radii larger than a predetermined minimum value.

The required minimum bending radii of the fibers are determined by the usage situations. It has turned out, for fibers used to transmit high-output radiation, that minimum bending radii of $\approx 0.3$ m are sufficient for connecting stationary appliances; that, for connecting mobile devices, $\approx 0.15$ m to 0.3 m is enough; for inscription purposes and for industrial robots, 0.1 m to 0.15 m, and that minimum bending radii of $\approx 0.05$ m will be adequate for extracorporal medical uses of power lasers. Although bending radii of less than 0.05 m are required for invasive medical applications, it is not clear at this time whether power lasers will at all be employed for such purpose.

If it were possible to use a fiber with a bending radius smaller than that needed for the particular usage, no advantage would be gained. Instead, in most cases express drawbacks would even have to be suffered with respect to the design of the fiber and the radiation distribution in the fiber. Therefore, it is advantageous to manufacture fibers which can be bent maximally exactly at the radius needed by the usage situation—of course considering adequate safety—and to ensure, optionally by mechanical devices, that this bending radius when using the fibers will not be at a lower value. An industrially usable fiber, therefore, should exhibit the following properties:

a high optical destruction threshold and/or a high maximally transmissible radiant power, no impairment of the beam quality by the transmission, high transmission efficiency, and a maximally accurate attainment and/or maintenance of the minimum bending radius of the fibers required for the practical applications.

Fibers and, respectively, fiber systems for transmission of laser radiation of high radiant power have been known in the patent and other literature.

U.S. Pat. No. 4,707,073 describes a fiber-optic beam guidance system for transmitting high radiation outputs wherein the fiber is cooled to prevent its overheating on account of radial coupling-out losses. The optical fiber has a very large core diameter of $1 \cdot 10^{-3}$ m and a cladding thickness of $1 \cdot 10^{-4}$ m (fiber SM 1000 of Dainichi-Nippon Cables, Tokyo, Japan). Thereby, the fiber surface becomes large, and heat transfer between fiber and cooling medium is satisfactory—however, the large diameter of this fiber prevents bending at the radius needed for many applications. On account of the large core diameter and the large numerical aperture, the fiber furthermore has the drawback that it cannot transmit laser radiation with the beam quality necessary for the applications.

With intensive cooling of the fiber, the problem can also occur that the mostly liquid coolant (e.g. water) penetrates the fiber coating, damages the fiber surface (e.g. by penetration of OH ions by diffusion, or by leaching), and reduces the mechanical strength of the fiber. Attempts have been made to counteract such drawbacks by using denser coating materials, such as metals, for example. European Patent Application EP No. 00 63 581 describes, for example, an optical fiber having even two metallic coatings in order to further enhance the density of the fiber shielding. With the use of such fibers for power transmission, the diameter of the fibers could, under certain circumstances, be markedly reduced. However, the realizable metal coatings do not exhibit the desired properties. Besides, other problems are caused by the metallic coatings: in order to attain appreciable layer thicknesses (about $50 \cdot 10^{-6}$ m), the metals must be applied in the liquid phase—however, due to thus-occurring thermal and mechanical stresses, the fiber properties are adversely affected. The properties (e.g. thermal expansion coefficient and modulus of elasticity) of the metals and fiber materials (mostly glasses) in question are greatly different. Thereby, mechanical stresses arise in the fiber which stresses, inter alia, evoke high microbend losses (for example: T. Shiota, H. Hidaka, 0. Fukuda and K. Inada, "High Temperature Effects of Aluminium Coated Fibers", IEEE J. Lightwave Techn. 4 : 1151, 1986). Last but not least, the radiation leaving the core and reaching the fiber coating is absorbed by the metal coating along a very short length—normally, the use of a metal coating has the result that the radiation losses are converted into heat with more intense localization; the thermal stress on the fiber is even increased.

Under the designations of "double-clad fibers" and "multiple-clad fibers", the literature discloses fibers having additional layers between core and cladding. However, such fibers are predominantly monomode fibers which are not suitable for transmission of high radiant outputs on account of the small core diameter. The purpose of the additional layers is the improvement of dispersion or the influence to be exerted on the cut-off condition of fibers for communications technology, these fibers transmitting only low-power radiation (several milliwatts).

In most cases, "depressed-cladding" fibers are involved (for example: H. R. D. Sunak and S. P. Bastien, "Universal Single-Mode Dispersion-Flattened Fluoride Fibre Designed for Optimum Performance from 1.5 to 2.9 μm", Electron. Lett. 24 : 879, 1988). In these fibers, the index of refraction of the additional intermediate layer is lower than the index of refraction of the innermost cladding layer. Similar considerations apply also to specific designs of multimode fibers: U.S. Pat. No. 4,691,990, for example, describes a fiber wherein, for producing a high numerical aperture, an additional layer of a glass having an especially low index of refraction is applied to the core; however, this layer is thin and is surrounded by another rugged glass jacket of higher index of refraction, for example because the mechanical properties of the material of this layer are unfavorable. Fibers wherein the index of refraction of the intermediate layer is lower than the index of refraction of the surrounding cladding exhibit, however, the drawback that the intermediate layer cannot conduct any radiation. Apart from this, fibers wherein, as is customary in industry, a maximally high numerical aperture is desired, cannot transmit radiation with the beam quality required for the applications, precisely because of the high numerical aperture.

Double- and multiple-clad fibers are also known wherein the refractive indexes of layers diminish radially from the inside toward the outside. However, in these fibers, the difference of refractive indexes between the material of the core and that of the first layer surrounding the core is larger than the refractive index differences between the materials of the subsequent layers (for example: L. Cohen, D. Marcuse and W. L. Mammel, "Radiating Leaky-Mode Losses in Single-Mode Lightguides with Depressed-Index Claddings", IEEE Journal of Quantum Electronics QE-18, p. 1467, 1982). It is furthermore characteristic that the index of refraction of the layers, after having reached a minimum, increases again radially, as described in U.S. Pat. No. 4,691,991 for a monomode fiber (such fibers, on account of the typical shape of the radial refractive index profile, are also called "W fibers").

The conventional double- and multiple-clad fibers have several advantageous properties for transmitting monomode radiation, but they are useless for transmitting multimode radiation, for example because the bending losses of the higher modes are high (for example: H. Schwierz and E.-G. Neumann, "Bend Losses of Higher-Order Modes in Dispersion Flattened Multiple Clad Optical Fibres", Electron. Lett. 24 : 1296, 1987). Besides, in multimode fibers, with the refractive index ratios of the double- and multiple-clad fibers, the radiation entering into the layers between core and cladding would very quickly exit from the fiber. Therefore, these layers could not be exploited in fibers for the transmission of high radiant outputs.

European Patent Application EP No. 02 34 233 describes a fiber for transmitting high radiant outputs wherein, in order to reduce radial radiation losses, the cladding consists of a radial layered system which acts in a similar way as the layered system of a dielectric mirror. For this purpsoe, it is necessary for the thickness of the layers to have the size of the radiation wavelength (i.e. less than $10^{-5}$ m), and for the differences in refractive index between neighboring layers to be large. The substantial disadvantage of this fiber resides in that the required tolerances are difficult to maintain from a manufacturing viewpoint, and that the fiber cannot be attuned to the beam product of the radiation and therefore cannot transmit radiation with the beam quality required for the usage situations.

SUMMARY OF THE INVENTION

This invention provides a multimode fiber suitable for the transmission of high radiant outputs which fiber can be bent with a predetermined radius, the core of which can transmit radiation without substantial increase in the beam product of the output radiation as compared to the input radiation, wherein the cross-sectional area of the core is adequately large, and wherein the bend-induced radiation losses are sufficiently low for avoiding damage to the fiber during input and output coupling and transmission of radiation, and wherein the radiation loss is distributed along adequately long fiber sections so that heating of the fiber or its surroundings is slight.

Thus, this invention relates to a flexible stepped-index optical fiber for transmission of high-power radiation, with a core and with a cladding made up of at least one layer, arranged substantially concentrically with respect to the core, wherein an intermediate layer which conducts radiation and is substantially concentric with respect to the core is located between the core and the cladding, and wherein the refractive index values for the core $n_1$, the radiation-conducting intermediate layer $n_2$, and for the innermost cladding layer $n_3$ decrease radially from the inside toward the outside, i.e., $n_1$ is larger than $n_2$, and $n_2$ is larger than $n_3$, characterized in that (a) the numerical aperture determined by $n_2$ and $n_1$, $$NA_1 = (n_1^2 - n_2^2)^{\frac{1}{2}}$$

amounts to 1.5 to 2.9 times the cube root of $(\theta \cdot D)/R_{min}$, but is larger than 0.05 and smaller than 0.28, wherein $(\theta \cdot D)$ is the product, known as beam product, of the full angular divergence $\theta$ in rad with the diameter D in m of the radiation to be coupled into the fiber, these data being based on the output of the radiation source, and $R_{min}$ in m is the minimum bending radius of the fiber required by the respective usages, (b) the diameter of the core $D_1$ in m is 0.45 to 0.65 times the quotient of $(\theta \cdot D)/NA_1$, (c) the numerical aperture determined by $n_3$ and $n_2$, $$NA_2 = (n_2^2 - n_3^2)^{\frac{1}{2}}$$

amounts to the single to double value of $NA_1$, (d) and that the outer diameter $D_2$ in m of the radiation-conducting intermediate layer is smaller than $0.15 \cdot R_{min} \cdot NA_2^2$.

The invention will be further described with reference to FIG. 1, showing the schematic structure of a fiber, a refractive index profile being indicated in the upper portion. The radial zones of the fiber and their refractive index profile are not drawn to scale, in order to promote clarity of illustration.

The essentially cylindrical fiber has a core 1 surrounded by a radiation-conducting intermediate layer 2 essentially concentric to the core, this layer being encompassed by a layer 3 which is likewise essentially concentric with respect to the core. The layer 3 can be additionally surrounded by a cover 5 made of one of the many materials known for fiber sheathing (coating). Customarily, the layer 3 is directly surrounded by a cladding 4 made of glass which protects the layer 3 from mechanical damage; with an appropriate design of the layer 5, the layer 4 can also be omitted.

The core 1, the radiation-conducting intermediate layer 2, and the layer 3 preferably consist of glass. The index of refraction of the core $n_1$, that of the radiation-conducting intermediate layer $n_2$, and the refractive index $n_3$ of layer 3 decrease radially from the inside toward the outside, i.e. $n_1$ is larger than $n_2$, and $n_2$ is larger than $n_3$. The absorption coefficient of the core 1 is generally smaller than 0.05 m$^{-1}$ and that of the radiation-conducting intermediate layer 2 is generally smaller than 0.25 m$^{-1}$; relatively highly absorbent materials are permitted for layer 3, but there is little sense in providing an absorption coefficient for this layer exceeding 20 m$^{-1}$.

The core 1, the radiation-conducting intermediate layer 2 and the layer 3 will be denoted hereinbelow as optically active layers of the fiber. In principle, the refractive indexes of the optically active layers can be utilized for describing the invention. However, this is unsuitable for practical purposes since, for example, the exact indexes of refraction can be measured at the fiber only in cumbersome fashion. A person skilled in the art will use instead the term of the numerical aperture and is capable, for example, on account of his experience, to compose the fiber components with the aid of a predetermined numerical aperture in such a way that the correct refractive indexes and/or refractive index proportions are obtained. The numerical aperture determined by the refractive index difference between the radiation-conducting intermediate layer 2 and the core 1 is $NA_1 = (n_1^2 - n_2^2)^{\frac{1}{2}}$, and the numerical aperture determined by the refractive index difference between the layer 3 and the radiation-conducting intermediate layer 2 is $NA_2 = (n_2^2 - n_3^2)^{\frac{1}{2}}$. Furthermore, numerical aperture $NA_3$ of the fiber is understood to mean the value $NA_3 = (n_1^2 - n_3^2)^{\frac{1}{2}}$ determined by the refractive index difference between the layer 3 and the core 1. Therefore, the following simple connection exists among the thus-defined values for the numerical aperture:

$$NA_3 = (NA_1^2 + NA_2^2)^{\frac{1}{2}}.$$

In order to transmit radiation with a beam product $(\theta \cdot D)$ in rad·m by means of a fiber bendable with a radius larger than or equal to the value $R_{min}$ in m required for the practical usages, without the radiation guided by the core 1 being substantially weakened by bending-induced losses, the numerical aperture $NA_1 = (n_1^2 - n_2^2)^{\frac{1}{2}}$ should be 1.5 to 2.9 times the value of $(\theta \cdot D / R_{min})^{\frac{1}{2}}$. If $NA_1$ is smaller than 1.5 times the value of $(\theta \cdot D / R_{min})^{\frac{1}{2}}$, then the beam guiding properties of the core 1 become too poor to be able to safely transmit high radiation outputs in this core. In contrast, if $NA_1$ is larger than 2.9 times $(\theta \cdot D / R_{min})^{\frac{1}{2}}$, the beam guiding properties are indeed very good, but the diameter of the core is then so small that there is danger of its destruction when high radiation outputs are coupled into the core.

If $NA_1$ can be larger than 1.6 times $(\theta \cdot D / R_{min})^{\frac{1}{2}}$, this value is preferred because thereby improved beam guidance properties and simplifications from a manufacturing viewpoint are obtained. If $NA_1$ can even be larger than 1.75 times $(\theta \cdot D / R_{min})^{\frac{1}{2}}$, this value is even more preferred. In case very high radiation peak outputs, e.g. more than 1 kW, are to be transmitted, then it is preferred in the interest of attaining higher operating safety for $NA_1$ to be smaller than 2.7 times $(\theta \cdot D / R_{min})^{\frac{1}{2}}$, in particular, for $Na_1$ to be smaller than 2.5 times $(\theta \cdot D / R_{min})^{\frac{1}{2}}$.

To prevent a substantial portion of the radiation to be coupled from core 1 into the radiation-conducting intermediate layer 2 on account of microbend losses, however, $NA_1$ should not drop below a specific lower limit: $NA_1$ is to be larger than 0.05, preferably even larger than 0.07. The aforedescribed fibers are thus unsuited for some applications. Such a case exists if $(\theta \cdot D)/R_{min}$ is smaller than $5 \cdot 10^{-6}$.

The diameter $D_1$ of core 1 in m is 0.45 to 0.65 times $(\theta \cdot D)/NA_1$ wherein the narrower range of 0.45 to 0.55 times $(\theta \cdot D)/NA_1$ is preferred. However, the manufacturing or adaptation clearance of the fibers could be too small for the preferred range of $D_1$ of (0.45 ... 0.55)·$(\theta \cdot D)/NA_1$. This holds true, in particular, in case the beam profile of the laser radiation fluctuates. In such a case, a value is used for $D_1$ from the broader range of (0.45 ... 0.65)·$(\theta \cdot D)/NA_1$. A value of 0.65·$(\theta \cdot D)/NA_1$ should not be exceeded because then the quality of the radiation would be greatly impaired by the transmission. The value should not drop below 0.45·$(\theta \cdot D)/NA_1$ because in such a case a large portion of the radiation would be coupled into the radiation-conducting intermediate layer 2 as early as during coupling of the radiation into the fiber.

The diameter $D_1$ should be smaller than $10^{-3}$ m. Otherwise, the total diameter of the fiber would be too large for handling since the core 1 is additionally surrounded at least by the radiation-conducting intermediate layer 2 and the layer 3, as well as optionally the jacket 4. It is furthermore necessary for $D_1$ to be at least $4 \cdot 10^{-5}$ m in order to be able to couple the radiation of power lasers of high efficiency into the core. Otherwise, too many optical components would be necessary for input coupling of the radiation.

It is generally necessary, for transmitting high radiation outputs, for the core 1 of the fiber to be able to conduct multimode radiation. For this purpose, $D_1 \cdot NA_1/\lambda$ should be larger than 0.8, wherein $\lambda$ is the wavelength of the laser radiation in m (for most lasers suitable in this connection, the radiation wavelength will range from about $5 \cdot 10^{-7}$ m to $1.1 \cdot 10^{-6}$ m). Under practical conditions, this requirement is met by the fibers of this invention.

With the use of these values for $NA_1$ and $D_1$, the following features are achieved:

The fiber can be bent with the radius $R_{min}$ without bending-induced radiation losses substantially weakening the radiation output coupled into the core 1.

The diameter $D_1$ of core 1 becomes maximally large under the given marginal conditions, coupling in radiation with the beam product $(\theta \cdot D)$ and bending capacity of the fiber with the radius $R_{min}$. For this reason, the fiber has a high destruction threshold, if the coupling-in geometry is correct.

The product of the numerical aperture $NA_1$ and the diameter $D_1$ is sufficient for coupling into the core 1 almost the entire radiation with the beam product $(\theta \cdot D)$ and for transmitting the radiation in the core.

An ordinary stepped-index fiber (i.e. a fiber without a radiation-conducting intermediate layer 2) having the numerical aperture $NA = NA_1$ and the core diameter $D = D_1$ could, under certain circumstances, already be suitable for transmitting radiation with good beam quality. However, such fiber would exhibit considerable drawbacks—in general, inordinately small values result for NA and large values for D. Consequently, when the fiber is bent, large transition losses occur, and it can be expected that as early as during the input coupling process, a portion of the radiation will not be captured by the core. On account of the fact that in ordinary fibers the transition and coupling-in losses occur in localized fashion, the fiber would probably be destroyed when transmitting high-power laser radiation. In order to keep the risks within technically tolerable limits, ordinary fibers in most cases thus cannot be optimized along the lines of this invention (adaptation to the beam product, attainment of the predetermined bending radius, large core diameter).

Beam guidance becomes more secure on account of the radiation-conducting intermediate layer 2: Radiation leaving the core 1 during input coupling, on account of bends or microbends, is guided in the radiation-conducting intermediate layer 2. This portion of the radiation is advantageously recaptured by the core 1 or is conducted in the radiation-conducting intermediate layer 2 up to the fiber end and there coupled out. However, it is also possible to allow a portion of this radiation, for example on account of bend or microbend losses, to be coupled out laterally from the radiation-conducting intermediate layer 2, i.e. it is entirely coupled out laterally from the fiber. However, due to the dimensioning of the radiation-conducting intermediate layer 2 according to this invention, it can be achieved that these output coupling losses are weak and do not occur in a localized fashion but rather are distributed over long fiber sections. The coupled-out portion of the radiation does not lead to damage, or requires a less expensive cooling system when transmitting high-power radiation: The coupling-out losses are less critical to the fiber system and, respectively, are less dangerous for the surroundings than in case of ordinary fibers.

The value for the numerical aperture $NA_2 = (n_2^2 - n_3^2)^{\frac{1}{2}}$ determined by the refractive index difference between the radiation-conducting intermediate layer 2 and the layer 3 is equal to or twice the value of $NA_1$. Thus, $NA_2$ is sufficient for securely enclosing radiation, leaving the core 1, for example due to bend or microbend losses, in the radiation-conducting intermediate layer 2. In order to prevent the lateral output coupling from the intermediate layer 2 from becoming too large, $NA_2$ is larger than $NA_1$. In such a case, the angle of total reflection at the interface between the layer 3 and the radiation-conducting intermediate layer 2, proportional to $NA_2$, is larger than the angle of total reflection at the interface between the radiation-conducting intermediate layer 2 and the core 1, proportional to $NA_1$. For this purpose, in principle, a maximally large value for $NA_2$ would actually be advantageous—however, since the core 1 already possesses good beam guiding properties, it is hardly necessary for $NA_2$ to exceed the value of $NA_1$ by more than twice the amount. On the other hand, it can also be desirable to couple out the radiation from the radiation-conducting intermediate layer 2 in a gradual way, i.e. over adequately long fiber sections, in order to minimize the thermal stress on the fiber. In this connection, it can be expedient for $NA_2$ to be smaller than twice $NA_1$.

If $NA_2$ is larger than $NA_1$, the effect can occur at the output coupling end, in certain cases advantageously, that the radiation guided by the radiation-conducting intermediate layer 2 leaves the fiber under a larger angular divergence than the radiation guided by the core 1. Thus, simple possibilities are produced for filtering the radiation of the radiation-conducting layer 2, which naturally cannot be focused as readily as the radiation of the core 1 and which thus could interfere in the usage of the device, out of the beam. Techniques for filtering this radiation out, such as, for example, the so-called "spatial filtering", are conventional.

The following applies for the numerical apertures: $NA_3 = (NA_1^2 + NA_2^2)^{\frac{1}{2}}$; under practical conditions, values are obtained for $NA_3$ which are in most cases from 0.18 to 0.32. However, the value of $NA_3 = (n_1^2 - n_3^2)^{\frac{1}{2}}$ is limited in a manner known per se by the manufacturing process (chemical composition of the fiber): $NA_3$ is smaller than an upper limit $NA_{max}$ which is different for every type of fiber (materials employed) and spectral range and can be denoted as the maximum numerical aperture of a fiber type.

Based on the limitation of the value for $NA_3$ by the maximum numerical aperture $NA_{max}$ of the fiber type, it is not possible in every case (specific fiber materials and manufacturing procedure) to attain any desired small bending radius with a fiber of a specific type. Such a case exists, for example, if the quotient of $(\theta \cdot D)/R_{min}$ is larger than about $0.1 \cdot NA_{max}^3$. With the preferred fibers wherein $NA_1$ is to be larger than approximately 1.6 times $(\theta \cdot D/R_{min})^{\frac{1}{2}}$, the bending radius $R_{min}$ can indeed only be reached if $(\theta \cdot D)/R_{min}$ is smaller than $0.08 \cdot NA_{max}^3$, and with the more strongly preferred fibers finally wherein $NA_1$ is to be larger than 1.75 times $(\theta \cdot D/R_{min})^{\frac{1}{2}}$, the bending radius $R_{min}$ can only be reached if $(\theta \cdot D)/R_{min}$ is smaller than $0.06 \cdot NA_{max}^3$.

The outer diameter $D_2$ in m of the radiation-conducting intermediate layer 2 should be smaller than $0.15 \cdot R_{min} \cdot NA_2^2$, preferably smaller than $0.12 \cdot R_{min} \cdot NA_2^2$, especially smaller even than $0.09 \cdot R_{min} \cdot NA_2^2$. In most cases, $D_2$ can be markedly larger than the diameter $D_1$ of the core 1. If the fact is tolerated that during input coupling a portion of the radiation is coupled into the radiation-conducting intermediate layer 2, it can consequently be permitted that, on the inlet surface of the fiber, the diameter of the laser beam is larger than the diameter of the core. Thereby, the radiation intensity on the inlet surface can be reduced.

However, the case may occur that values for $D_2$ are also permissible which are larger than $1.25 \cdot 10^{-3}$ m. Since the layer 3 and the cladding 4 are additionally disposed on the radiation-conducting intermediate layer 2, the total diameter of the fiber would then become very large. Although fibers with a large total diameter can be manufactured and, under certain circumstances, are also usable, they are hard to handle and endangered by breakage in case of bending. For this reason, $D_2$ is smaller than $1.25 \cdot 10^{-3}$ m and preferably smaller than $10^{-3}$ m.

The layer 3 directly resting on the radiation-conducting intermediate layer is to be maximally thin in order to improve the mechanical properties of the fiber, but it must be of adequate thickness to securely enclose the radiation. For this reason, the thickness of this layer 3 in m is larger than $0.1 \cdot \lambda/NA_2$, preferably larger than $0.2 \cdot \lambda/NA_2$, wherein $\lambda$ is the wavelength (based on the vacuum) of the radiation to be transmitted by the fiber. The production of fibers having very thin cladding layers, especially if the refractive index of these layers is to be accurately maintained, can, however, be very expensive from a manufacturing viewpoint. It is therefore preferred that the thickness of the layer 3 and of the cladding 4 lies within the range of $5 \cdot 10^{-6}$ m to $25 \cdot 10^{-6}$ m, which is more favorable for manufacturing purposes; in other words, such thickness amounts to a multiple of the radiation wavelength. In general, the mechanical properties of the fiber are not impaired thereby.

In principle, it is also possible to use, in place of only one layer 3, a pack of layers consisting of several radial layers which functions, for example, like a dielectric mirror and effects an even more secure enclosure of the radiation in the radiation-conducting intermediate layer 2. The layer 3 can also exhibit a gradient profile increasing from the inside toward the outside wherein $n_3$ is determined by the index of refraction of the portion of layer 3 adjoining layer 2. These embodiments, however, would bring hardly any additional advantages as compared with the basic fiber of this invention. Yet, very narrow tolerances would have to be maintained in the manufacture of the fiber so that the production process would become disproportionately more expensive. Thus, such embodiments are nor preferred.

Eccentricities caused by the manufacture and minor deviations of the refractive index profile of the fiber from the cylinder symmetry, and minor fluctuations of the refractive index profile on the interfaces between the various optically effective zones of the fiber, and the so-called "dip" in the center of the core (lowering of refractive index caused by the collapsing of the fiber preform) only insubstantially impair the beam guiding properties of the described fiber and thus are included in this invention.

Furthermore, the invention includes the feature that the cross-sectional profile of the fiber in the zone of its input or output coupling end can be shaped (so-called "tapering") in order to adapt such end to the beam profile of the radiation to be coupled in, and/or in order to adapt the profile of the coupled-out radiation to the beam profile desired for the applications, or in order to reduce the surface intensity at the fiber end faces. Such a shaping can be achieved by a thermoplastic molding of the fiber at the ends, fully conventionally.

Furthermore, it is also clear that the invention includes the feature that the layer 3 can be doped with additives effecting an increased absorption of the laser radiation. This attains the result that the radiation coupled out of the core is absorbed during the reflections on the interface between the radiation-conducting intermediate layer 2 and the layer 3, in order to achieve a definite conversion of the leakage radiation into heat.

The ground and polished input and output coupling surfaces of the fiber (fiber end faces) are oriented maximally perpendicularly to the fiber axis. The treatment of the end faces of optical fibers with the required optical quality is state of the art. The invention includes that the fiber end faces are provided with antireflection coatings (AR coatings) or that the volume between the input coupling optic and the fiber is filled with an immersion fluid in order to reduce the input coupling lsoses by surface reflections.

The radiation can be coupled into the core 1 in such a way that the core is maximally completely illuminated and exposed to radiation in a maximally uniform fashion. In this arrangement, the predominant portion of the radiation is to enter the core 1. Although a portion of the radiation is allowed to enter the radiation-conducting intermediate layer 2—it is, however, more advantageous so as to attain a higher transmission efficiency and a better beam quality of the transmitted radiation, to obtain a maximally complete coupling of the radiation into the core 1. The beam axis of the laser beam to be coupled into the fiber is most extensively in parallel orientation with respect to the fiber axis. The angular range of the radiation to be coupled in, i.e. the full angular divergence or the full angular convergence of the radiation at the coupling-in surface, based on the surface normal of the coupling-in surface, is smaller than twice the value of $NA_2$ and preferably smaller than double the value of $NA_1$. Realization of these coupling-in conditions and/or geometry is state of the art.

In the wavelength range below about $2.5 \cdot 10^{-7}$ m, there high-power radiation sources exist (for example, excimer lasers and anti-Stokes-shifted Raman lasers), but there is presently no need for fiber-optic beam guide systems, optimized in accordance with this invention, for these sources. Besides, the difficulty can occur for this spectral range that at present there are no suitable fiber materials available. With the availability of suitable fiber materials, an optimized fiber can be routinely manufactured according to this invention also for this spectral zone. Such fibers thus are part of this invention and/or equivalents thereto.

In the wavelength range from about $2.5 \cdot 10^{-7}$ m to about $2 \cdot 10^{-6}$ m, there is a series of lasers with high radiant power (e.g., Nd, dye, metal vapor, and excimer lasers), a fiber described along the lines of this invention being suitable for the transmission thereof. For this spectral range, a fiber is preferred, the optically active zones of which (the core 1, the radiation-conducting intermediate layer 2, and the layer 3) except for insubstantial additives (e.g., essentially unavoidable impurities), are composed only of $SiO_2$, fluorine-doped $SiO_2$ ($F:SiO_2$), as well as of $SiO_2$ which can optionally contain conventionally $GeO_2$, $B_2O_3$, $P_2O_5$, $Al_2O_3$, $TiO_2$, $Ta_2O_5$ or $ZrO_2$. In this connection, the predominant component is to be $SiO_2$ which has an index of refraction of about 1.46 (the refractive indexes depend on the radiation wavelength). By fluorine doping or by admixtures of $B_2O_3$, within an industrially conventional scope, the index of refraction of $SiO_2$ can be lowered; the remaining admixtures to $SiO_2$ have an effect that increases the refractive index. The production of optical fibers from these materials is state of the art; the further development and/or optimization of the manufacturing techniques is not a subject of this invention. The amounts of dopants in a given component will be routinely selected to achieve a desired index of refraction chosen in accordance with this invention, e.g., perhaps in conjunction with simple parametric experiments and fully conventional considerations. Mixture of dopants can be used in a given component where desired. See, e.g., R. Th. Kersten "Einfuehrung in die optische Nachrichten technik", Springer Verlag, New York 1983, esp. pp. 157-163; M. Poulain, Halide Glasses, J. of Non-Crystalline Solids, 56, 1-14 (1983); Shigeki et al., Low Loss Optical Fibers for Midinfrared Optical Communications, J. of Light w. Techn., LT5, 1219-1228 (1987); and Rusconi et al., Optical Power Propagation in Chalcogenide Glass Fibers at 10.6 $\mu$m, Proc. SPIE, 929, 115-122.

$TiO_2$, $ZrO_2$ and $Ta_2O_5$ have a strongly increasing effect on the refractive index in $SiO_2$ and could be considered as use for components of core 1. However, since these materials at the same time raise the radiation attenuation (absorption) of $SiO_2$, the use thereof for the core of fibers for power transmission is generally not preferred. If possible, the optically effective zones of the fiber are to be composed, therefore, only of zones of $SiO_2$, $F:SiO_2$, or $SiO_2$ with $GeO_2$. $B_2O_3$, or $P_2O_5$, except for insubstantial additives.

It is most preferred for the optically active zones of the fiber to consist solely of $SiO_2$ and $F:SiO_2$, except for insubstantial additives, because it has been found that these materials exhibit high destruction thresholds and high threshold values for nonlinear optical effects (for example, the stimulated Raman effect). In particular, the core 1 in this case is to consist of pure $SiO_2$, and the refractive index difference between core 1 and radiation-conducting intermediate layer 2, necessary for producing the numerical aperture $NA_1$, is to be adjusted by the fluorine doping of the intermediate layer 2; and the refractive index difference between the radiation-conducting intermediate layer 2 and layer 3, necessary for producing the numerical aperture $NA_2$, is to be adjusted by a stronger fluorine doping of layer 3.

Permitting, in this connection, the technically conveniently reachable value for the fluorine doping of layer 3, a value of about 0.24 can be obtained with the fiber for $NA_{max}$. A value of almost 0.17 could be attained for $NA_1$ for these fibers, but it is practical to limit $NA_1$ to 0.16. Therefore, this embodiment is possible only if the quotient $(\theta \cdot D)/R_{min}$ from the beam product of the radiation to be coupled into the fiber, $(\theta \cdot D)$, and the minimum bending radius $R_{min}$ required by the fiber is less than about $1.2 \cdot 10^{-3}$. The preferred embodiment wherein $NA_1$ is larger than 1.6 times $(\theta \cdot D/R_{min})^{\frac{1}{2}}$ is possible if $(\theta \cdot D)/R_{min}$ is smaller than about $0.98 \cdot 10^{-3}$, and the even more preferred embodiment wherein $NA_1$ is larger than 1.75 times $(\theta \cdot D/R_{min})^{\frac{1}{2}}$ is possible if $(\theta \cdot D)/R_{min}$ is smaller than about $0.74 \cdot 10^{-3}$.

Permitting, for the fluorine doping of layer 3, the technically practical value (e.g., about 2–3 mole %), then a value of even about 0.28 ... 0.30 can be obtained for $NA_{max}$ with the fiber. Normally, though, this is avoided because the strong fluorine doping adversely affects the properties of the fiber material (e.g. bubble formation, mechanical characteristics). However, in the fibers of this invention, the strongly doped layer 3 can be kept very thin, thereby preventing the deleterious properties from having an intolerable effect. Besides, the radiation reaches this layer with weakened intensity (as compared with that in core 1); thereby, light dispersion by bubbles, for example, can be prevented from having a telling effect. Another possibility of increasing the value for $NA_{max}$ to above 0.24 is to additionally admix $B_2O_3$ to the layer 3. Although admixtures of $B_2O_3$ likewise reduce the stress-bearing ability of the fiber material, and $B_2O_3$ furthermore exhibits several absorption bands in the near infrared spectral region, the core 1 and the radiation-conducting intermediate layer 2 of the fiber, most greatly stressed by the radiation, still consist essentially only of $SiO_2$ and (more weakly doped) $F:SiO_2$. For this reason, this embodiment likewise makes it possible to attain high damage limit values and high threshold values for undesirable nonlinear optical processes. However, the refractive-index-lowering effect of $B_2O_3$ in $SiO_2$ and $F:SiO_2$ is only minor. Therefore, this embodiment, when keeping the admixtures of $B_2O_3$ within a technically sensible scope, can also be utilized if a value of about 0.30 is adequate for $NA_{max}$. A value of 0.21 could be reached for $NA_1$ in connection with the two last-mentioned types of fiber (strongly doped $F:SiO_2$ fiber and $B_2O_3$ doped fiber), but it is practical to limit $NA_1$ to 0.20. These embodiments, therefore, are possible only if $(\theta \cdot D)/R_{min}$ is smaller than abut $2.4 \cdot 10^{-3}$. The preferred embodiments wherein $NA_1$ is larger than 1.6 times $(\theta \cdot D/R_{min})^{\frac{1}{2}}$ are possible if $(\theta \cdot D)/R_{min}$ is smaller than about $1.9 \cdot 10^{-3}$, and the more preferred embodiments wherein $NA_1$ is larger than 1.75 times $(\theta \cdot D/R_{min})^{\frac{1}{2}}$ are possible if $(\theta \cdot D)/R_{min}$ is smaller than about $1.44 \cdot 10^{-3}$.

The core 1 can also contain admixtures of $GeO_2$ in case a value of 0.24 to 0.30 is not sufficient for the numerical aperture $NA_3$ and, respectively, $NA_{max}$. However, in order to maintain these admixtures within a technically sensible frame, this embodiment is to be utilized in case a value of more than 0.35 is not needed for $NA_3$ and, respectively, $NA_{max}$. Accordingly, $NA_1$ could attain a value of almost 0.25, but it is practical to limit $NA_1$ to 0.23. Therefore, this embodiment is possible only if the quotient $(\theta \cdot D)/R_{min}$ is smaller than about $3.6 \cdot 10^{-3}$. The preferred embodiment wherein $NA_1$ is larger than 1.6 times $(\theta \cdot D/R_{min})^{\frac{1}{2}}$ is possible if $(\theta \cdot D)/R_{min}$ is smaller than about $2.9 \cdot 10^{-3}$, and the more strongly preferred embodiment wherein $NA_1$ is larger than 1.75 times $(\theta \cdot D/R_{min})^{\frac{1}{2}}$ is possible if $(\theta \cdot D)/R_{min}$ is smaller than about $2.2 \cdot 10^{-3}$.

In case a value of 0.35 is still not as yet adequate for the numerical aperture $NA_3$ or $NA_{max}$, $P_2O_5$ can furthermore be admixed to the core 1. However, in order to maintain these admixtures within an industrially practical scope, this embodiment is to be employed only if a value of less than 0.40 is sufficient for $NA_{max}$. Thus, a value of 0.28 could be attained for $NA_1$, but in this case it makes sense to limit $NA_1$ to 0.27. (Fibers having a value of above about 0.27 for $NA_1$ would furthermore be impractical because for such fibers the coupling in and coupling out of the radiation would become too expensive.) Therefore, this embodiment is possible if $(\theta \cdot D)/R_{min}$ is smaller than about $5.9 \cdot 10^{-3}$. The preferred embodiment wherein $NA_1$ is larger than 1.6 times $(\theta \cdot D/R_{min})^{\frac{1}{2}}$ is possible if $(\theta \cdot D)/R_{min}$ is smaller than about $4.7 \cdot 10^{-3}$, and the more preferred embodiment, finally, wherein $NA_1$ is to be larger than 1.75 times $(\theta \cdot D/R_{min})^{\frac{1}{2}}$ is possible if $(\theta \cdot D)/R_{min}$ is smaller than about $3.5 \cdot 10^{-3}$.

However, a substantial reduction of the damage threshold values and the threshold values for nonlinear optical processes must be tolerated due to the admixtures of $GeO_2$ and $P_2O_5$. Consequently, these types of fibers are usable only for lower radiation outputs and, respectively, for shorter transmission distances. Furthermore, for this reason, it is preferred in the two last-mentioned embodiments that, in layer 3, the fluorine doping or the admixture of $B_2O_3$ has a value which can be acceptably industrially obtained in an approximation, or which otherwise makes good sense. As a result, the additional admixtures to the core 1 can be at a low level.

A number of lasers with high radiation output (e.g. Er lasers with a radiation wavelength around $2.9 \cdot 10^{-6}$ m) are suitable, within a wavelength range of about $2 \cdot 10^{-6}$ m to about $4 \cdot 10^{-6}$ m, for transmission by a fiber described in accordance with this invention. For radiation in a spectral region of about $2 \cdot 10^{-6}$ m to about $4 \cdot 10^{-6}$ m, a fiber is preferred wherein the optically active zones (core 1, radiation-conducting intermediate layer 2, and layer 3) consist essentially of mixtures of fluoride glass components, preferably, $ZrF_4$, $HfF_4$, $LaF_3$, $AlF_3$, $GdF_3$, $BaF_2$, $LiF$, $NaF$ and $YF$, and, even more preferably, consist only of the heavy metal fluoride glass components $ZrF_4$, $HfF_4$, $BaF_2$, $LaF_3$ and $AlF_3$.

Since at the present time the manufacturing tolerances for fluoride glass fibers are higher than for silicate glass fibers, stronger microbend losses are to be expected with such fibers. $NA_1$ is larger than 0.07 in order to prevent, due to microbend losses, a substantial portion of the radiation to be coupled from core 1 into the radiation-conducting intermediate layer 2. Therefore, the fibers are unsuitable if $(\theta \cdot D)/R_{min}$ is smaller than $1.4 \cdot 10^{-5}$.

With the fluoride glass fibers, types are preferred wherein $NA_{max}$ is at most 0.20 because in such a case the proportion of the components is within industrially readily attainable ranges. Then, a value of almost 0.14 could be obtained for $NA_1$. This embodiment, therefore, is possible only if the quotient $(\theta \cdot D)/R_{min}$ of the beam product $(\theta \cdot D)$ of the radiation to be coupled into the fiber and the minimum bending radius $R_{min}$ required by the fiber is smaller than about $8.2 \cdot 10^{-4}$. The preferred embodiment wherein $NA_1$ is larger than 1.6 times $(\theta \cdot D/R_{min})^{\frac{1}{2}}$ is possible if $(\theta \cdot D)/R_{min}$ is smaller than about $6.5 \cdot 10^{-4}$, and the more preferred embodiment wherein $NA_1$ is larger than 1.75 times $(\theta \cdot D/R_{min})^{\frac{1}{2}}$ is possible if $(\theta \cdot D)/R_{min}$ is smaller than about $4.9 \cdot 10^{-4}$.

Allowing for the ratio of the components of the fluoride glasses the industrially attainable value then a value of about 0.40 is possible for $NA_{max}$ (however, in general this embodiment is avoided because thereby the mechanical properties of the fiber are impaired and the radiation attenuation of the fiber materials increases). In this connection, it makes sense to limit $NA_1$ to 0.25. Therefore, this embodiment is possible if $(\theta \cdot D)/R_{min}$ is smaller than about $4.6 \cdot 10^{-3}$. The preferred embodiment wherein $NA_1$ is larger than 1.6 times $(\theta \cdot D/R_{min})^{\frac{1}{2}}$ is possible if $(\theta \cdot D)/R_{min}$ is smaller than about $3.7 \cdot 10^{-3}$, and the more preferred embodiment wherein $NA_1$ is larger than 1.75 times $(\theta \cdot D/R_{min})^{\frac{1}{2}}$ is possible if $(\theta \cdot D)/R_{min}$ is smaller than about $2.8 \cdot 10^{-3}$.

In the spectral region with wavelengths of about $3 \cdot 10^{-6}$ m to about $1.1 \cdot 10^{-5}$ m, there are likewise several lasers with high radiation output (for example, CO lasers with a radiation wavelength around $5 \cdot 10^{-6}$ m and $CO_2$ lasers with a radiation wavelength around $10^{-5}$ m) suitable for transmission with the use of a fiber in accordance with this invention, insofar as the required refractive index relationships can be realized by means of the fiber materials.

Suitable fiber materials for this spectral region are fibers of so-called chalcogenide glasses and fibers of polycrystalline materials, e.g. cesium crystals and silver halide crystals (for example mixtures of AgBr and AgI). Recent fibers of polycrystalline materials do have the advantage that very low absorption coefficients can be attained thereby—however, once these fibers are aging or are subjected to strong mechanical stresses (these materials are in most cases prone to plastic deformation under mechanical stresses), then the absorption coefficient can rise by several orders. Chalcogenide glasses do exhibit elastic behavior when subjected to mechanical stresses, and the absorption coefficient is consequently little dependent on the mechanical stress, but in this case it can be difficult, especially for the spectral region with wavelengths of above $10^{-5}$ m, to find chalcogenide glasses at all which have a sufficiently low absorption coefficient.

In total, for radiation in the spectral region of about $3 \cdot 10^{-6}$ m to about $1.1 \cdot 10^{-5}$ m, a fiber is preferred wherein the optically active zones (core 1, radiation-conducting intermediate layer 2, and layer 3) consist substantially of mixtures of chalcogenide glasses, preferably mixtures made up primarily of the (As, Ge, Sb, Se, Te, In, S) system ($AsSe_3$, $AsS_3$, etc.). The production of these glasses and the manufacture of fibers from these glasses are known.

Since the manufacturing tolerances for chalcogenide glass fibers are once again higher than those for fibers of silicate glass, even greater microbend losses can be expected with these fibers. In order to reduce these losses, $NA_1$ is larger than 0.09. For this reason, the fibers are unsuitable in case $(\theta \cdot D)/R_{min}$ is smaller than $2.9 \cdot 10^{-5}$.

Chalcogenide glass mixtures make it possible to attain very large differences in refractive index between the optically active zones of a fiber (a refractive index range of about 2.55 to about 2.95 can be covered). For this reason, these fibers make it possible to reach large values for the numerical aperture up to the physical upper limit of about 1. However, it is sensible to restrict $NA_{max}$ to about 0.40. Thus, a value of 0.28 could be reached for $NA_1$. Consequently, this embodiment is possible if $(\theta \cdot D)/R_{min}$ is smaller than about $6.6 \cdot 10^{-3}$. The preferred embodiment wherein $NA_1$ is larger than 1.6 times $(\theta \cdot D/R_{min})^{\frac{1}{2}}$ is possible if $(\theta \cdot D)/R_{min}$ is smaller than about $4.7 \cdot 10^{-3}$, and the more preferred embodiment wherein $NA_1$ is larger than 1.75 times $(\theta \cdot D/R_{min})^{\frac{1}{2}}$ is possible if $(\theta \cdot D)/R_{min}$ is smaller than about $3.5 \cdot 10^{-3}$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding application Federal Republic of Germany P No. 39 12 400.2-51, filed Apr. 15, 1989, are hereby incorporated by reference.

EXAMPLE 1

For inscription purposes, the radiation of a pulsed Nd laser, radiation wavelength $\approx 1.06 \cdot 10^{-6}$ m, is to be transmitted. The radiant power, with 100 kW to 1 MW, is so high that the embodiment having the highest destruction threshold is to be utilized wherein the optically active zones consist only of $SiO_2$ and $F:SiO_2$.

The beam product $\theta \cdot D$ of the laser radiation amounts to about $4 \cdot 10^{-5}$ rad·m, and the fiber is to be bendable with a bending radius $R_{min}$ of 0.1 m. With these numerical values, a value of $4 \cdot 10^{-4}$ is found for $(\theta \cdot D)/R_{min}$. Since this value is smaller than $0.74 \cdot 10^{-3}$, the radiation can indeed be transmitted by the most preferred fiber wherein the optically active zones consist of $SiO_2$ and $F:SiO_2$ and wherein the maximum numerical aperture $NA_{max}$ is about 0.24 and, for $NA_1$, is smaller than 0.16.

$NA_1$ should range between 1.75 times and 2.5 times $(\theta \cdot D/R_{min})^{\frac{1}{2}}$, i.e., it should range between 0.129 and 0.184; however, for a fiber of the above composition, 0.16 is the maximum value. A fiber is used with $NA_1 \approx 0.14$, satisfying, on the one hand, the requirement for small $NA_1$ values, but, on the other hand, still providing a distance from the minimum value required by the manufacturing tolerances.

It is preferred for the diameter $D_1$ of the core to be between $1.26 \cdot 10^{-4}$ m and $1.57 \cdot 10^{-4}$ m; the median value of $1.45 \cdot 10^{-4}$ m is used in order to have an adaptation clearance. Furthermore, $NA_{max} \approx 0.24$ and $NA_2 \approx 0.19$ are utilized.

For the diameter $D_2$ of the radiation-conducting intermediate layer, the larger value according to the foregoing is employed, $0.12 \cdot R_{min} \cdot NA_2^2 \approx 4.3 \cdot 10^{-4}$ m because it is advantageous for the intended usage application (inscription) to distribute the leakage radiation of the core over a large-area intermediate layer. After the optical imaging of the leakage radiation on the workpiece, the threshold intensity needed for writing will then not be attained at that location.

EXAMPLE 2

For machining a material, the radiation of an Nd:YAG laser, radiation wavelength $1.064 \cdot 10^{-6}$ m, with a chronologically stable beam profile, is to be transmitted by a fiber. The radiant power of this laser is smaller than 2 kW. The beam product $\theta \cdot D$ of the laser radiation is about $1.5 \cdot 10^{-4}$ rad·m. and the fiber is to be bendable with a minimum bending radius $R_{min}$ of 0.15 m. With these numerical values, a value of $10^{-3}$ is found for the quotient $(\theta \cdot D)/R_{min}$, i.e. less than $1.44 \cdot 10^{-3}$: The radiation can thus be transmitted with a fiber, the optically active zones of which consist almost exclusively of $SiO_2$, $F:SiO_2$, and $B_2O_3$, and the maximum numerical aperture $NA_{max}$ of which is smaller than about 0.30.

A fiber is employed with $NA_1 \approx 0.18$, which is still somewhat larger than the preferred lower limit for $NA_1$. For the diameter $D_1$ of the core, a value is used of $4.2 \cdot 10^{-4}$ m, which corresponds to 0.51 times $(\theta \cdot D)/NA_1$. Since strong dopings are to be avoided, a value of only 0.28 is utilized for the maximum numerical aperture $NA_{max}$. Thus, $NA_2$ has a value of $\approx 0.21$. The mean output of this laser is very high; for this reason, lateral coupling-out events from the radiation-conducting intermediate layer are to be most extensively avoided because this could lead to destruction of the fiber. The diameter $D_2$ of the radiation-conducting intermediate layer amounts to $0.09 \cdot R_{min} \cdot NA_2^2 \approx 5.95 \cdot 10^{-4}$ m. A fiber is employed with $D_2 \approx 6 \cdot 10^{-4}$ m. This fiber diameter is readily usable for practical applications of the fiber.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flexible stepped-index optical fiber suitable for transmission of high-power radiation, comprising a core, a cladding, comprising at least one layer, arranged substantially concentrically with respect to the core, and located between the core and the cladding, an intermediate layer which conducts radiation and is also substantially concentric with respect to the core, wherein the refractive index values for the core $n_1$, the radiation-conducting intermediate layer $n_2$, and for the innermost cladding layer $n_3$ decrease radially from the inside toward the outside ($n_1 > n_2 > n_3$) and, (a) the numerical aperture determined by $n_2$ and $n_1$, $$NA_1 = (n_1^2 - n_2^2)^{\frac{1}{2}}$$

is 1.5 to 2.9 times the cube root of $(\theta \cdot D)/R_{min}$, but is larger than 0.05 and smaller than 0.28, wherein $(\theta \cdot D)$, the beam product, is the product of the full angular divergence $\theta$ (rad) and the diameter $D$ (m) of the radiation to be coupled into the fiber, these parameters being those of the beam at the output point of the radiation source, and $R_{min}$ (m) is the minimum bending radius of the fiber determined by a desired end use, (b) the diameter of the core $D_1$ (m) is 0.45 to 0.65 times the quotient $(\theta \cdot D)/NA_1$, (c) the numerical aperture determined by $n_3$ and $n_2$, $$NA_2 = (n_2^2 - n_3^2)^{\frac{1}{2}}$$

is from equal-to to double the value of $NA_1$, and (d) the outer diameter $D_2$ (m) of the radiation-conducting intermediate layer is smaller than $0.15 \cdot R_{min} \cdot NA_2^2$.

2. An optical fiber according to claim 1, wherein $NA_1$ is larger than 1.6 times the cube root of $(\theta \cdot D)/R_{min}$.

3. An optical fiber according to claim 1, wherein $NA_1$ is larger than 1.75 times the cube root of $(\theta \cdot D)/R_{min}$.

4. An optical fiber according to claim 1, wherein $NA_1$ is smaller than 2.7 times the cube root of $(\theta \cdot D)/R_{min}$.

5. An optical fiber according to claim 1, wherein $NA_1$ is smaller than 2.5 times the cube root of $(\theta \cdot D)/R_{min}$.

6. An optical fiber according to claim 1, wherein the diameter $D_1$ (m) is 0.45 to 0.55 times $(\theta \cdot D)/NA_1$.

7. An optical fiber of claim 1, wherein the diameter $D_1$ is larger than $4 \cdot 10^{-5}$ m and smaller than $10^{-3}$ m.

8. An optical fiber according to claim 1, wherein the outer diameter $D_2$ of the radiation-conducting intermediate layer, in m, is smaller than $0.12 \cdot R_{min} \cdot NA_2^2$.

9. An optical fiber according to claim 1, wherein the outer diameter $D_2$ of the radiation-conducting intermediate layer, in m, is smaller than $0.09 \cdot R_{min} \cdot NA_2^2$.

10. An optical fiber according to claim 1, wherein the thickness $(D_2 - D_1)/2$ of the radiation-conducting intermediate layer of the fiber is larger than $25 \cdot 10^{-6}$ m.

11. An optical fiber according to claim 1, wherein the thickness $(D_2 - D_1)/2$ of the radiation-conducting intermediate layer of the fiber is larger than $5 \cdot 10^{-6}$ m.

12. An optical fiber according to claim 1, wherein the thickness of the innermost cladding layer in m is larger than $0.1 \cdot \lambda/NA_2$, wherein $\lambda$ in m denotes the wavelength of the radiation to be transmitted, and $NA_2$ is the numerical aperture of the radiation-conducting intermediate layer.

13. An optical fiber according to claim 1, wherein the thickness of the innermost cladding layer in m is larger than $0.2 \cdot \lambda/NA_2$, wherein $\lambda$ in m denotes the wavelength of the radiation to be transmitted, and $NA_2$ is the numerical aperture of the radiation-conducting intermediate layer.

14. An optical fiber according to claim 1 for transmission of radiation in the wavelength range from $2.5 \cdot 10^{-7}$ m to $2 \cdot 10^{-6}$ m, wherein the core, the radiation-conducting intermediate layer, and the innermost cladding layer consist essentially of only $SiO_2$, fluorine-doped $SiO_2$ ($F:SiO_2$), or of $SiO_2$ or $F:SiO_2$ doped with $GeO_2$, $B_2O_3$, $P_2O_5$, $Al_2O_3$, $TiO_2$, $Ta_2O_5$ or $ZrO_2$.

15. An optical fiber according to claim 14, wherein the core, the radiation-conducting intermediate layer, and the innermost cladding layer consist essentially of only $SiO_2$, $F:SiO_2$, or of $SiO_2$ or $F:SiO_2$ doped with $B_2O_3$, $GeO_2$ or $P_2O_5$, and the sum total of the squares of the numerical apertures $NA_1$ and $NA_2$ is smaller than 0.16 or $(NA_1^2 + NA_2^2)^{\frac{1}{2}}$ is smaller than 0.4.

16. An optical fiber according to claim 14, wherein the core, the radiation-conducting intermediate layer, and the innermost cladding layer consist essentially of only $SiO_2$, $F:SiO_2$, or of $SiO_2$ or $F:SiO_2$ doped with $B_2O_3$ or $GeO_2$, and $(NA_1^2 + NA_2^2)^{\frac{1}{2}}$ is smaller than 0.35.

17. An optical fiber according to claim 14, wherein the core, the radiation-conducting intermediate layer, and the innermost cladding layer consist essentially of only $SiO_2$, $F:SiO_2$, or of $SiO_2$ or $F:SiO_2$ doped with $B_2O_3$, and $(NA_1^2 + NA_2^2)^{\frac{1}{2}}$ is smaller than 0.30.

18. An optical fiber according to claim 14, wherein the core, the radiation-conducting intermediate layer, and the innermost cladding layer consist essentially of only $SiO_2$ and $F:SiO_2$, and $(NA_1^2+NA_2^2)^{\frac{1}{2}}$ is smaller than 0.24.

19. An optical fiber according to claim 1 for transmission of radiation in the wavelength range from $2 \cdot 10^{-6}$ m to $4 \cdot 10^{-6}$ m, wherein the core, the radiation-conducting intermediate layer, and the innermost cladding layer consist essentially of only $ZrF_4$, $HfF_4$, $LaF_3$, $AlF_3$, $GdF_3$, $BaF_2$, $LiF$, $NaF$ and $YF$; $NA_1$ is larger than 0.07 and smaller than 0.25; and $(NA_1^2+NA_2^2)^{\frac{1}{2}}$ is smaller than 0.4.

20. An optical fiber according to claim 19, wherein $NA_1$ is smaller than 0.14 and $(NA_1^2+NA_2^2)^{\frac{1}{2}}$ is smaller than 0.2.

21. An optical fiber according to claim 1 for transmission of radiation in the wavelength range from $3 \cdot 10^{-6}$ m to $1.1 \cdot 10^{-5}$ m, wherein the core, the radiation-conducting intermediate layer, and the innermost cladding layer consist essentially of only chalcogenide glasses; $NA_1$ is larger than 0.09 and smaller than 0.28; and $(NA_1^2+NA_2^2)^{\frac{1}{2}}$ is smaller than 0.50.

* * * * *